(12) United States Patent
Jourdan et al.

(10) Patent No.: US 9,710,557 B2
(45) Date of Patent: Jul. 18, 2017

(54) PARTITIONING A SEARCH SPACE FOR DISTRIBUTED CRAWLING

(71) Applicant: International Business Machines Corporation, Armonk, NY (US)

(72) Inventors: Guy-Vincent Jourdan, Ottawa (CA); Iosif Viorel Onut, Ottawa (CA); Seyed M. Taheri, Ottawa (CA); Gregor von Bochmann, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 495 days.

(21) Appl. No.: 14/035,626

(22) Filed: Sep. 24, 2013

(65) Prior Publication Data

US 2014/0195510 A1    Jul. 10, 2014

(30) Foreign Application Priority Data

Sep. 24, 2012 (CA) ..................................... 2790479

(51) Int. Cl.
*G06F 17/30* (2006.01)

(52) U.S. Cl.
CPC .............................. *G06F 17/30864* (2013.01)

(58) Field of Classification Search
CPC ... G06F 17/30864; G06Q 30/02; G06Q 10/10
USPC ........................................................ 707/710
See application file for complete search history.

(56) References Cited

U.S. PATENT DOCUMENTS

| | | | |
|---|---|---|---|
| 7,054,952 B1 * | 5/2006 | Schwerdtfeger et al. | 709/246 |
| 7,725,452 B1 * | 5/2010 | Randall | G06F 17/30864 707/705 |
| 8,392,890 B2 * | 3/2013 | Miller | 717/127 |
| 8,832,065 B2 * | 9/2014 | Prasad | 707/709 |

(Continued)

FOREIGN PATENT DOCUMENTS

| | | |
|---|---|---|
| CN | 101594377 A | 12/2009 |
| CN | 102480524 A | 5/2012 |

OTHER PUBLICATIONS

Shreeraj Shah, 'Crawling Ajax-driven Web 2.0 Applications', Net-Square (Net-Square Solutions Private Limited), Jan. 18, 2007, p. 1-9.

(Continued)

*Primary Examiner* — Scott A Waldron
*Assistant Examiner* — Dongming Wang
(74) *Attorney, Agent, or Firm* — Cantor Colburn LLP (57) ABSTRACT

An illustrative embodiment of a computer-implemented process for partitioning a crawling space computes an event identifier for each event in the set of events to form an identified set of events, segments the identified set of events into a number of partitions, assigns a partition to each node in a set of nodes and executes each event in each assigned partition by a respective node. In response to a determination that a new state is discovered, other nodes are notified of the new state, in which information associated with the new state is added to a respective assigned set of event IDs at each node. In response to a determination that no more notifications exist, the computer-implemented process determines whether more events to process exist and terminates in response to a determination that no more events to process exist.

20 Claims, 7 Drawing Sheets

(56) References Cited

U.S. PATENT DOCUMENTS

| | | | |
|---|---|---|---|
| 2003/0225852 A1* | 12/2003 | Bae | 709/213 |
| 2004/0181588 A1* | 9/2004 | Wang | H04L 67/327 |
| | | | 709/207 |
| 2010/0010967 A1* | 1/2010 | Muller | 707/3 |
| 2010/0088668 A1 | 4/2010 | Yoshihama et al. | |
| 2011/0173178 A1 | 7/2011 | Conboy et al. | |
| 2012/0005211 A1 | 1/2012 | Ayoub et al. | |
| 2012/0054272 A1 | 3/2012 | Borodin | |
| 2012/0109930 A1 | 5/2012 | Prasad | |
| 2012/0131428 A1 | 5/2012 | Tsai et al. | |

OTHER PUBLICATIONS

Zhaomeng Peng et. al., 'Graph-based Ajax Crawl: Mining Data From Rich Internet Applications', 2012 International Conference on Computer Science and Electronics Engineering, Mar. 23, 2012, p. 590-594.

Research on Agent collaboration and Web partition in WAN-based distributed Web crawlers; Mar. 20, 2010; 8 pages, English Abstract Attached.

* cited by examiner

Partitioning system
300

PARTITIONING A SEARCH SPACE FOR DISTRIBUTED CRAWLING

PRIORITY

This application claims priority under 35 U.S.C. §119 to Canadian Patent Application No. 2790479, filed 24 Sep. 2012, and all the benefits accruing therefrom under 35 U.S.C. §119, the contents of which in its entirety are herein incorporated by reference.

BACKGROUND

This disclosure relates generally to indexing of web pages in a data processing system and more specifically to partitioning a crawling space for distributed crawling in the data processing system.

Distributed crawling of web applications has been a topic of extensive research for approximately twenty years. See, for example, Web Crawling, 2010, By Christopher Olston and Marc Najork. However, typical proposed solutions focused on crawling of conventional or non-AJAX applications. See, for example, UbiCrawler: A Scalable Fully Distributed Web crawler, Jan. 27, 2003, Paolo Boldi, Bruno Codenotti, Massimo Santini, Sebastiano Vigna; and Distributed Web Crawling over DHTs, 2004, Boon Thau Loo Owen Cooper Sailesh Krishnamurthy. The term "AJAX" generally refers to a collection of web-based technologies used to implement web applications capable of communicating with a server in the background, while not interfering with a current state of the web page. AJAX implementations typically include combinations of technologies including hypertext markup language (HTML) or extensible hypertext markup language (XHTML) with cascading style sheets used for presentation purposes, a document object model (DOM) for the dynamic display of data and interaction with data, extensible markup language (XML) for data definition and interchange and extensible markup language (XML) for the interchange of data, and extensible stylesheet language transformations (XSLT) for data transformations, extensible markup language hypertext transport protocol request (XMLHttpRequest) objects providing a capability for asynchronous communication and JavaScript providing a "glue" language for combining the technologies.

In non-AJAX applications, a one-to-one correspondence between a state of a document object model (DOM) and a corresponding universal resource locator (URL) exists. Thus, traditional crawlers typically use matrices primarily using the URL to partition a search space. See, for example, Design and Implementation of a High-Performance Distributed Web Crawler, 2002, Vladislav Shkapenyuk and Torsten Suel. Using the described framework each crawler is responsible for a specific set of URLs in which a particular crawler is responsible to go to an original URL and obtain information regarding new URLs located using the original URL. When a newly discovered URL falls within a set of URLs allocated to another crawler node, the first node communicates with the second node to inform the second node about the newly discovered URLs by the first node.

Increased use of interactive and AJAX based JavaScript libraries has caused the number of AJAX enabled rich Internet applications (RIAs) to increase rapidly. In the RIA type of applications, a one-to-one correspondence between a state of the DOM and the URL does not exist as in the non-AJAX applications. Therefore, techniques used in traditional crawlers typically do not work, or do not work well, in such applications. For example, a crawler may not be able to reach all states merely by sending the URL, while partitioning of the search space may not continue to be based on the URL.

When processing an RIA type application, a crawler may execute an event to materialize a new page, in contrast with typical traditional applications in which a crawler could simply view a destination URL and identify a node responsible for the URL. Further, when processing a non-AJAX application, a cost of reaching a page in traditional website is typically constant because at any point a crawler can simply jump to any page having the URL. The cost varies, however, when processing an RIA because reaching a state in a sequence of events is typically followed by an increasing variable cost. The cost function associated with crawling web pages is therefore an important factor with regard to crawler performance matrices associated with coverage and timeliness of coverage.

SUMMARY

According to one embodiment, a computer-implemented process for partitioning a crawling space computes an event identifier for each event in the set of events to form an identified set of events, segments the identified set of events into a number of partitions, assigns a partition to each node in a set of nodes for execution of each event in each assigned partition by a respective node. Responsive to a determination that a new state is discovered, other nodes are notified of the new state, in which information associated with the new state is added to a respective assigned set of event IDs at each node. Responsive to a determination that no more notifications exist, the computer-implemented process determines whether more events to process exist. In addition, responsive to a determination that no more events to process exist, the computer-implemented process terminates.

According to another embodiment, a computer program product for partitioning a crawling space resides on a non-transitory computer storage medium storing computer executable program code. The computer executable program code computes an event identifier for each event in the set of events to form an identified set of events. The computer executable program code further segments the identified set of events into a number of partitions, assigns a partition to each node in a set of nodes, executes each event in each assigned partition by a respective node, and determines whether a new state is discovered. In response to a determination that the new state is discovered, the computer executable program code notifies other nodes of the new state, adds information associated with the new state to a respective assigned set of event IDs at each node, and determines whether more notifications exist. Then, in response to a determination that no more notifications exist, the computer executable program determines whether more events to process exist. The process is then terminated in response to a determination that no more events to process exist.

According to another embodiment, an apparatus for partitioning a crawling space includes a communications fabric and a memory connected to the communications fabric that contains computer executable program code. The apparatus further includes a communications unit connected to the communications fabric, an input/output unit connected to the communications fabric, a display connected to the communications fabric, and a processor unit connected to the communications fabric. The processor unit executes the computer executable program code to direct the apparatus to compute an event identifier for each event in the set of events to form an identified set of events. The apparatus then segments the identified set of events into a number of partitions, assign a partition to each node in a set of nodes, executes each event in each assigned partition by a respective node, and determines whether a new state is discovered. In response to determination that the new state is discovered, the apparatus notifies other nodes of the new state. The apparatus also adds information associated with the new state to a respective assigned set of event IDs at each node, determines whether more notifications exist and, in response to a determination that no more notifications exist, determines whether more events to process exist. The apparatus then terminates the process in response to a determination that no more events to process exist.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, in which like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments of the present invention may take the form of a computer program product embodied in one or more computer readable medium(s) having computer readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
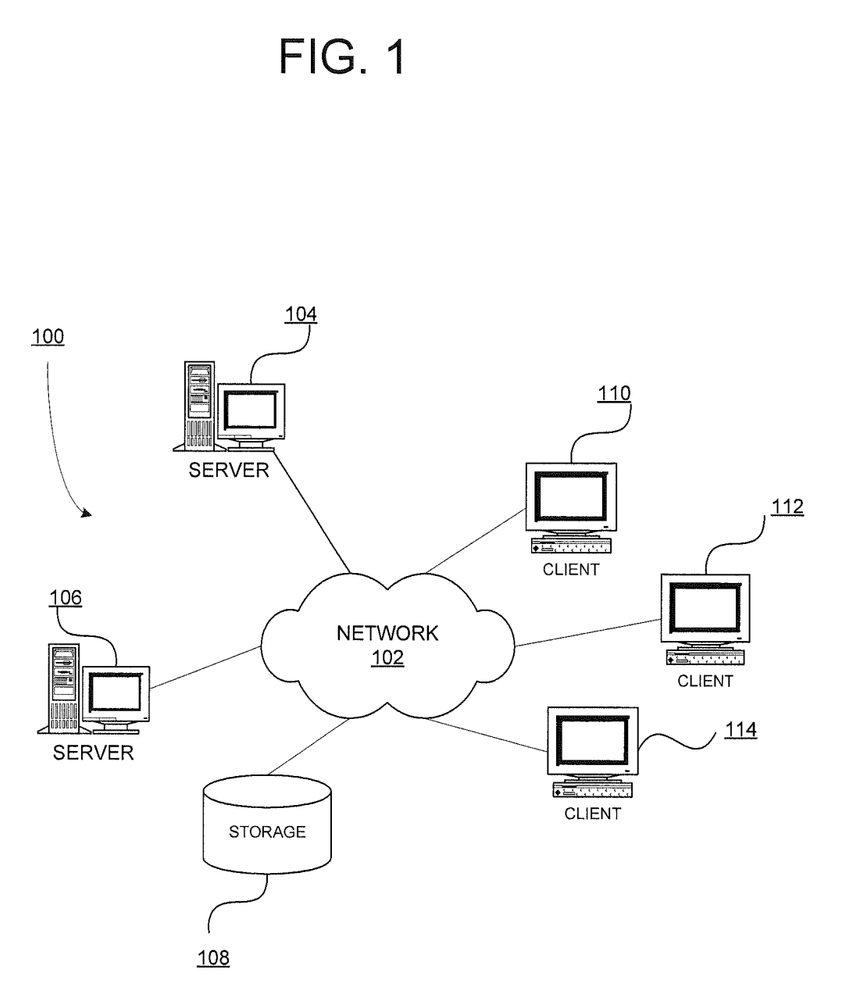
FIG. 1 is a block diagram of an exemplary network data processing system operable for various embodiments of the disclosure.
Figure 2:
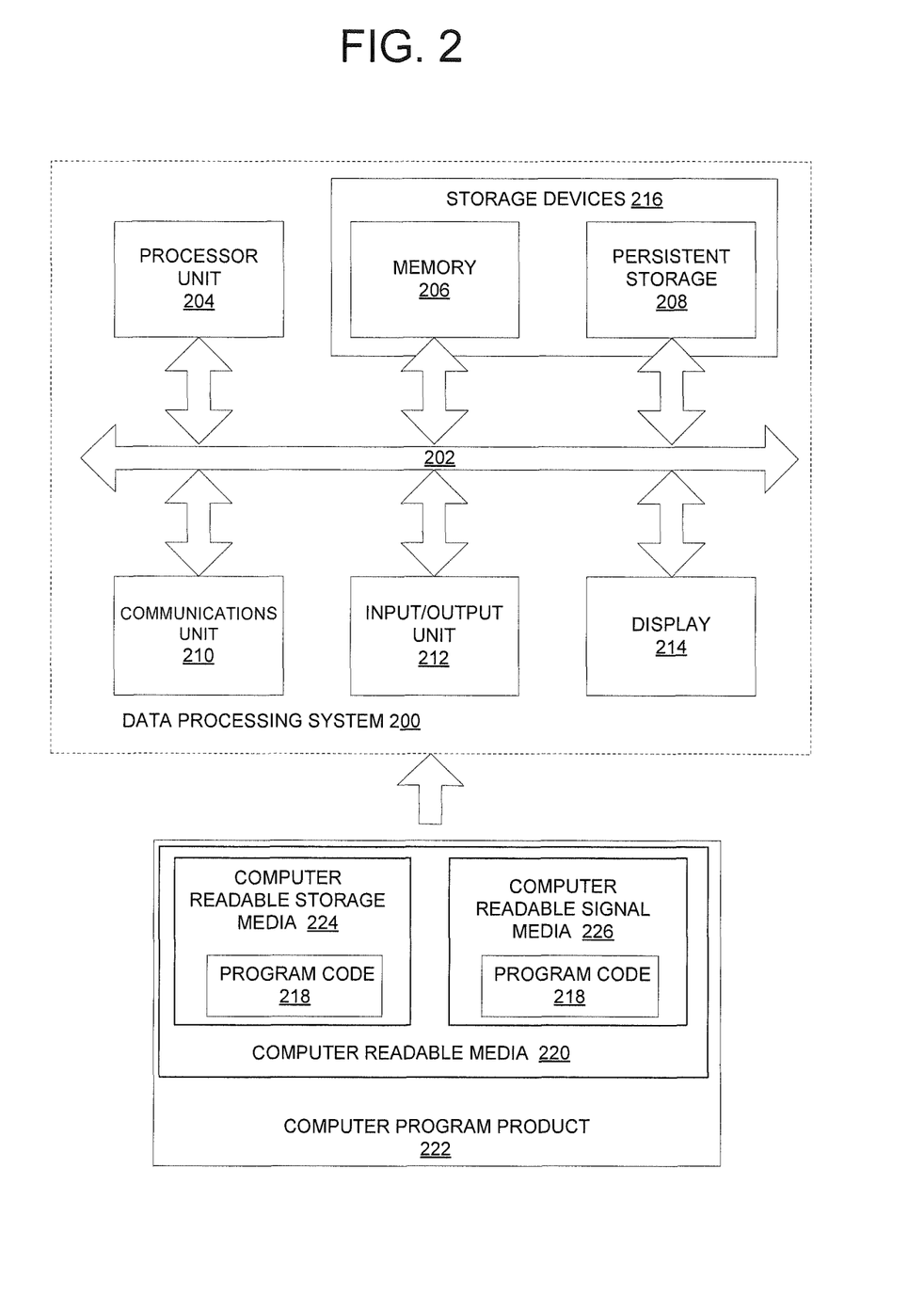
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments of partitioning a crawling space may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure of partitioning a crawling space is presented.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for partitioning a crawling space is presented. Processor unit 204 computes an event identifier for each event in the set of events, in a document object model retrieved from storage devices 216, to form an identified set of events. Processor unit 204 segments the identified set of events into a number of partitions, and assigns a partition to each node in a set of nodes. Processor unit 204 initiates execution of each event in each assigned partition by a respective node. Responsive to a determination that a new state is discovered, other nodes are notified of the new state by processor unit 204 using communications unit 210, in which information associated with the new state is added to a respective assigned set of event IDs at each node. Responsive to a determination that no more notifications exist, processor unit 204 determines whether more events to process exist and responsive to a determination that no more events to process exist, processor unit 204 terminates the partitioning process.

Figure 3:
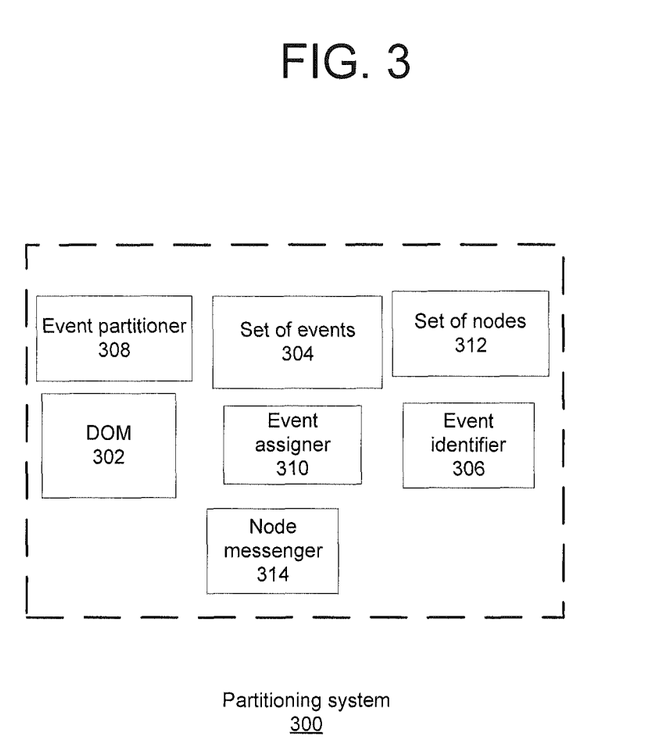
FIG. 3 is a block diagram of a partitioning system operable for various embodiments of the disclosure.

With reference to FIG. 3 a block diagram of a partitioning system operable for various embodiments of the disclosure is presented. Partitioning system 300 is an example of a system for partitioning a crawling space of a rich Internet application for distributed crawling.

Partitioning system 300 leverages support of an underlying data processing system such as server 106 in network data processing system 100 of FIG. 1 or data processing 200 of FIG. 2. Partitioning system 300 includes a number of functional components including DOM 302, set of events 304, event identifier 306, event partitioner 308, event assigner 310, set of nodes 312 and node messenger 314. The components of partitioning system 300 may be implemented as a set of individual components as in FIG. 300 or in some combination of function without loss of capability.

DOM 302 provides a capability of defining a set of events 304 comprising different states of an object representation of a rich Internet application. DOM 302 is a data structure representing a set of different states and associated JavaScript events.

Set of events 304 defines a set of JavaScript events defined in a respective document object model data structure such as DOM 302. Events are actions that can be detected by JavaScript. Each element used on a web page has one or more associated particular events, which can trigger a JavaScript. For example, an onclick event associated with a button element is used to indicate a function executes when a user selects (clicks) the button. Typical events include clicking on an element, a page completes loading, an image completes loading, mouse-cursor moving over an element, entering an input field, submitting a form and a keystroke performed.

Event identifier 306 provides a capability to uniquely identify each JavaScript event associated with a particular instance of DOM 302. Event identifier 306 represents a set of capabilities for identifying the events in a document object model using a selected identification method. For example, a method of identification may include use of an event index with the document object model or may be use of an XML Path Language path (XPath) of the specific event as an event identifier. XML Path Language is a query language that uses path expressions to navigate in XML documents for selecting nodes from an XML document and provides syntax for defining parts of an XML document.

Event partitioner 308 provides a capability to segment the events identified using event identifier 306 into predetermined segments or partitions. Event partitioner 308 provides a set of capabilities including selectable methods of partitioning. Methods of partitioning include defining a partition as a specific number of events per node, a percentage of events per node, a number of partitioned events determined by dividing by the number of nodes, and a number of partitioned events proportional to a processing capability of each node. A method selected for partitioning may also be dependent upon a method used to identify events.

Event partitioner 308 may be implemented as a function that all individual nodes can call. In one embodiment event partitioner 308 may be implemented as a module of individual crawlers, which decentralizes the set of nodes enabling a node to recognize without additional communication when an event belongs to the respective node. In another embodiment event partitioner 308 may be implemented as a module of a centralized unit that manages all nodes in which additional communication is needed among the nodes and the central unit to synchronize information.

Event assigner 310 provides a capability of allocating or assigning the results of event partitioner 308 to each node in set of nodes 312. Event assigner 310 is capable of assigning the events as a list of JavaScript events to a node in the set of nodes 312 or other data structure including an array, or database entry appropriate for a particular node in set of nodes 312.

Set of nodes 312 provides a capability of processing an assigned event in a set of events previously assigned to the particular node in set of nodes 312. Each node is a worker unit in a set or pool of workers responsible to process all events assigned in which each assigned event represents a unit of work. During processing of events a node may discover additional new states. Responsive to discovering a new state, a node informs or notifies all other nodes of the discovery using node messenger 314. Node messenger 314 may be an existing communication network or a specialized communication mechanism for set of nodes 312. Communication includes broadcast, token passing, and posting to a common site where other nodes periodically view posts to identify additional work items. As a result of receiving notice of a newly discovered state, other nodes add the newly discovered state and along with the sequences of JavaScript actions required to reach the state.

Figure 4:
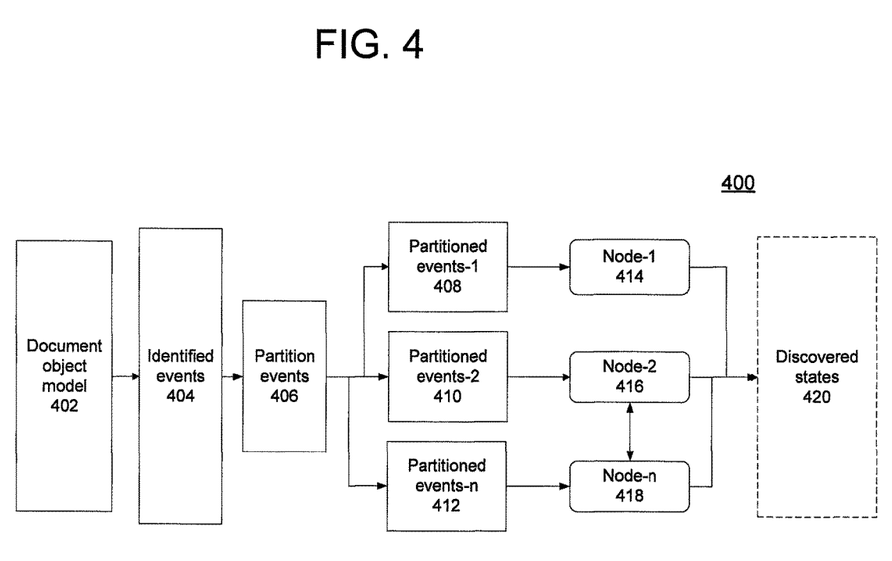
FIG. 4 is a block diagram of a data flow in the partitioning system of FIG. 3 operable for various embodiments of the disclosure.

With reference to FIG. 4 a block diagram of a data flow in a partitioning system operable for various embodiments of the disclosure is presented. Flow 400 is an example of a process flow among logical units of a system for partitioning a crawling space of a rich Internet application for distributed crawling as in partitioning system 300 of FIG. 3.

Rather than URL partitioning as in current technology embodiments of the disclosed partitioning system perform partitioning a RIA using the JavaScript events. Embodiments of the disclosed framework include a set of nodes, which have a capability of discovering new and different states of the DOM; exchange information for the states and each node executes assigned events in each DOM.

Document object model 402 is a data structure comprising a set of JavaScript events. Each JavaScript event in Document object model 402 is processed to have assigned a unique ID to form identified events 404. The event identifier can be computed using one of various known methods. For example, using a first method, the index for an event in an associated DOM is used. The index can be computed by traversing the associated DOM from the root towards the leaves using a breadth first search. Using this method, the first JavaScript event encountered has index 0, and a next JavaScript event encountered has index 1, and so on until all JavaScript events are encountered and indexed. In a second method, the XPath of the JavaScript event is considered as an event ID. Other methods may also be used to produce unique identifiers for each JavaScript event to be processed.

Regardless of the method of computing the event IDs, once the event IDs are computed, the set of event IDs are partitioned into groups, segments or partitions using a process of partition events 406 using an event partitioner, for example, event partitioner 308 of FIG. 3. As previously described, the event partitioner can be hosted on individual nodes as well rather than at a centralized site because the partitioning functions for an document object model and will consistently divide a search space. When an event partitioner is centralized, a partitioning method can be updated or replaced on demand for use across all nodes.

The output of partition events 406 is in the form of partitioned events-1 408, partitioned events-2 410 through partitioned events-n 412. The number of partitions is dependent upon the processing resources available in the form of nodes such as node-1 414, node-2 416 through node-n 418. One or more ranges of IDs (partitioned events) are assigned to each node in the set of nodes. The partitioning and assignment ensures no overlap in a search space for individual nodes and each node accordingly is directed to specific events to execute. During the processing of the events at respective nodes new states may be discovered as in discovered states 420. When new states are discovered the information is shared among the nodes to ensure complete coverage of any associated events.

Generally a number of events in a respective DOM representative of a RIA is much higher than a number of states. All of the events defined in the respective DOM are to be executed to ensure no missing states associated with the respective DOM. By partitioning a search space using the JavaScript events, communication between nodes is typically only needed when new events are discovered during processing of the assigned events, while allowing the nodes to execute assigned events without communicating with other nodes, and without overlaps in the search space. Thus embodiments of the disclosed process typically require a minimum of communication among the nodes while ensuring all events in respective DOMs are executed, enabling a thorough crawling of the represented RIA.

Because unique event identifiers are used and assigned individual nodes typically do not explore the same search space, and do not require many messages sent among the nodes to enforce partitioning of the search space. An intrinsic characteristic of the disclosed partitioning system is that an event is not assigned to two or more nodes; therefore two or more nodes never execute the same event for the purpose of discovering states.

Figure 5:
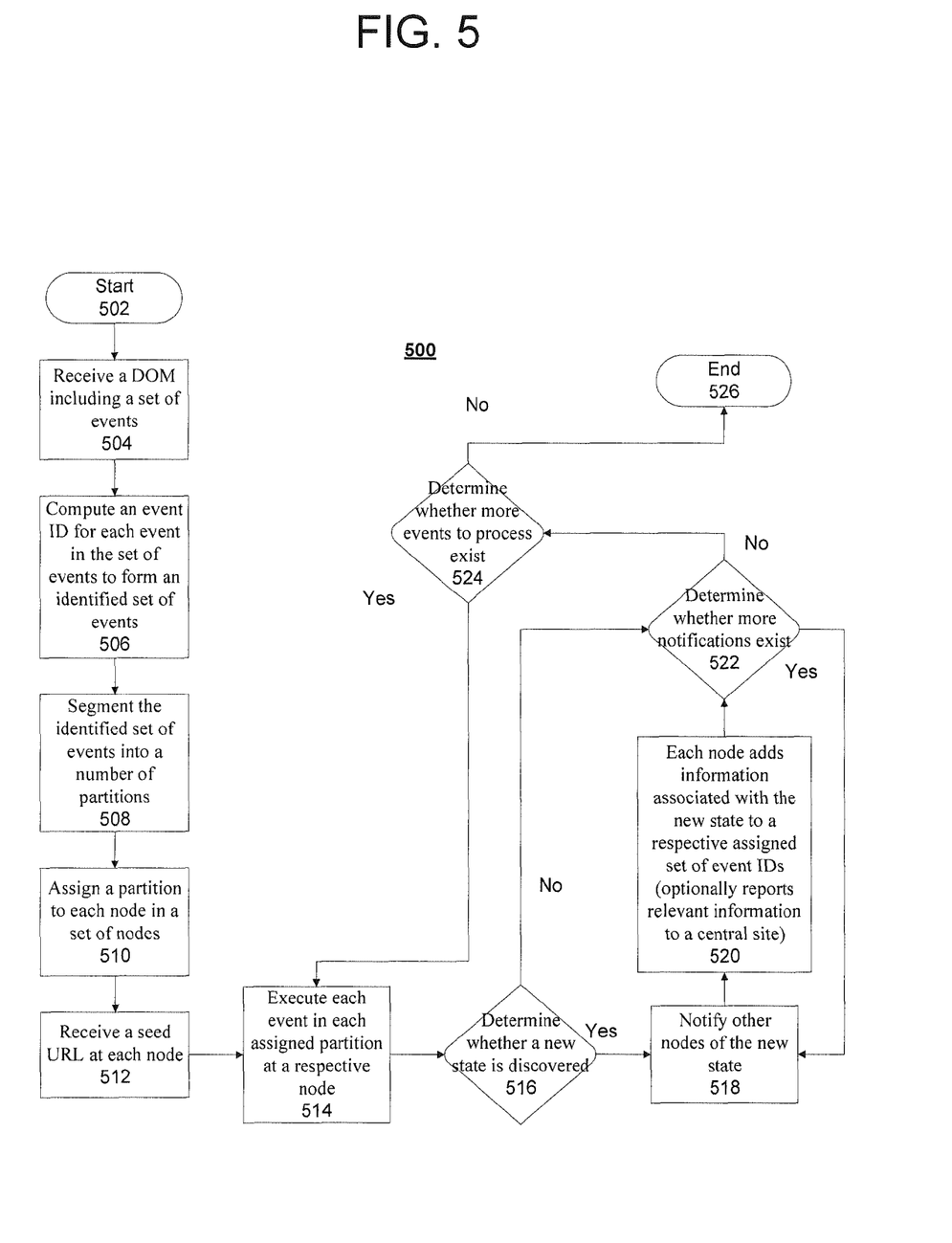
FIG. 5 is a flow chart of a process used in the partitioning system of FIG. 3 in accordance with one embodiment of the disclosure.

With reference to FIG. 5 a flow chart of a process used in a partitioning system operable for various embodiments of the disclosure is presented. Process 500 is an example of a process using a system for partitioning a crawling space of a rich Internet application for distributed crawling as in partitioning system 300 of FIG. 3.

Process 500 begins (step 502) and receives a document object model (DOM) including a set of events (step 504). The set of events, as previously described, is a set of JavaScript events representative of a rich Internet application (RIA). The received DOM may include one or more DOMs as needed to represent the particular RIA.

Process 500 computes and event ID for each event in the set of events to form a set of identified events (step 506). Each event identifier is a unique value among a set of identifiers computed for a respective set of events as defined in the DOM.

Process 500 segments or partitions the identified set of events into a number of partitions (step 508). The number of partitions is typically dependent upon a number of nodes available for processing of the identified events and proportional to the number of available nodes. When resources are less constrained increased parallelism can be attained through assignment of more nodes for processing of the identified set of events rather than fewer nodes.

Process 500 assigns a partition to each node in a set of nodes (step 510). In some cases one or more partitions may be assigned to a node without loss of function using the disclosed process. Assignment of more than one partition to a node simply extends the processing time at the node because of the extra work required to process the additional events.

The division of the events into partitions depends on a method used to compute the event identifiers. Using the previous identifier computation examples, when the first method is used, a division of the event identifiers can be achieved using ranges and a modulo function. For instance, when two nodes are available a first node is assigned all of the even events and the second node is assigned all of the odd events. Generalizing the example then recites, for n nodes each node receives 1/n set of events. For each event the identifier modulo n provides the index of the node responsible for executing the particular event associated with the event identifier.

When the second is used, division can be accomplished using a tree structure of the respective DOM and assigning different branches to the different nodes.

Process 500 ensures all nodes receive an initial seed URL to initiate processing (step 512). Each node executes each event in each assigned partition (step 514). During processing of the assigned events on each node process 500 determines whether a potentially new state is discovered (step 516).

Responsive to a determination that a potentially new state is not discovered, at a particular node, process 500 skips ahead to step 522. Responsive to a determination that a potentially new state is discovered, at a particular node, process 500 notifies other nodes of the potentially new state (step 518). Notification can be accomplished in a number of formats. Methods of notification include communicating the information by nodes broadcasting, or using a token ring, or other means of communication of the newly discovered states that have not been broadcasted previously, including sequences of JavaScript actions required to reach the new states.

Upon discovering, or receiving a new state from the other nodes each node adds information associated with the new state to a respective to do list of assigned set of event identifiers (520).

Process 500 determines whether more notifications exist (step 522). Responsive to a determination that more notifications exist, process 500 loops back to perform step 518 as before. Responsive to a determination that no more notifications exist, process 500 determines whether more events to process exist (step 524). Responsive to a determination that more events to process exist, process 500 loops back to perform step 514 as before. Responsive to a determination that no more events to process exist, process 500 terminates (step 526).

A process for partitioning the crawling space of a Rich Internet Application for distributed crawling is disclosed. The disclosed process includes identifying an event identifier for an event in a set of the events in a document object model (DOM), in which an identifier is assigned using one of a first computation using an index of the events in the DOM, in which the index is computed by walking the DOM starting from a root outward towards leaves using a breadth first search, in which a first JavaScript event encountered is assigned an index value of 0, and each next JavaScript event is assigned an index value incremented by 1 from a previous JavaScript event and a second computation in which an XPath of the identified event forms the event identifier.

The disclosed process further divides the identified event identifiers among nodes, in which a division is determined according to a method used to compute the event identifiers, in which when the first computation is used, division of the event identifiers uses ranges and a modulo function, in which for n nodes each node will get 1/n set of events and for each event the identifier modulo n provides an index of the node responsible for executing that particular event identifier, and when the second computation is used, the division is determined using a tree structure of the DOM assigning different branches to different nodes.

Responsive to making each node aware of an associated event, all nodes receiving an initial seed universal resource locator (URL) using the disclosed process and executing the events assigned to each node, by each node, to discover potentially new states.

Responsive to discovering new states, the nodes of the disclosed process, communicate the newly discovered states that have not been communicated before, along with sequences of JavaScript actions required to reach the newly discovered states to other nodes. Responsive to at least one of discovering, or receiving a new state from other nodes each node adds a new state to an associated to do list.

The disclosed process further determines whether a node has anything to broadcast, or any event to execute and responsive to a determination that the node does not have anything to broadcast, or any event to execute, the disclosed process terminates.

Figure 6:
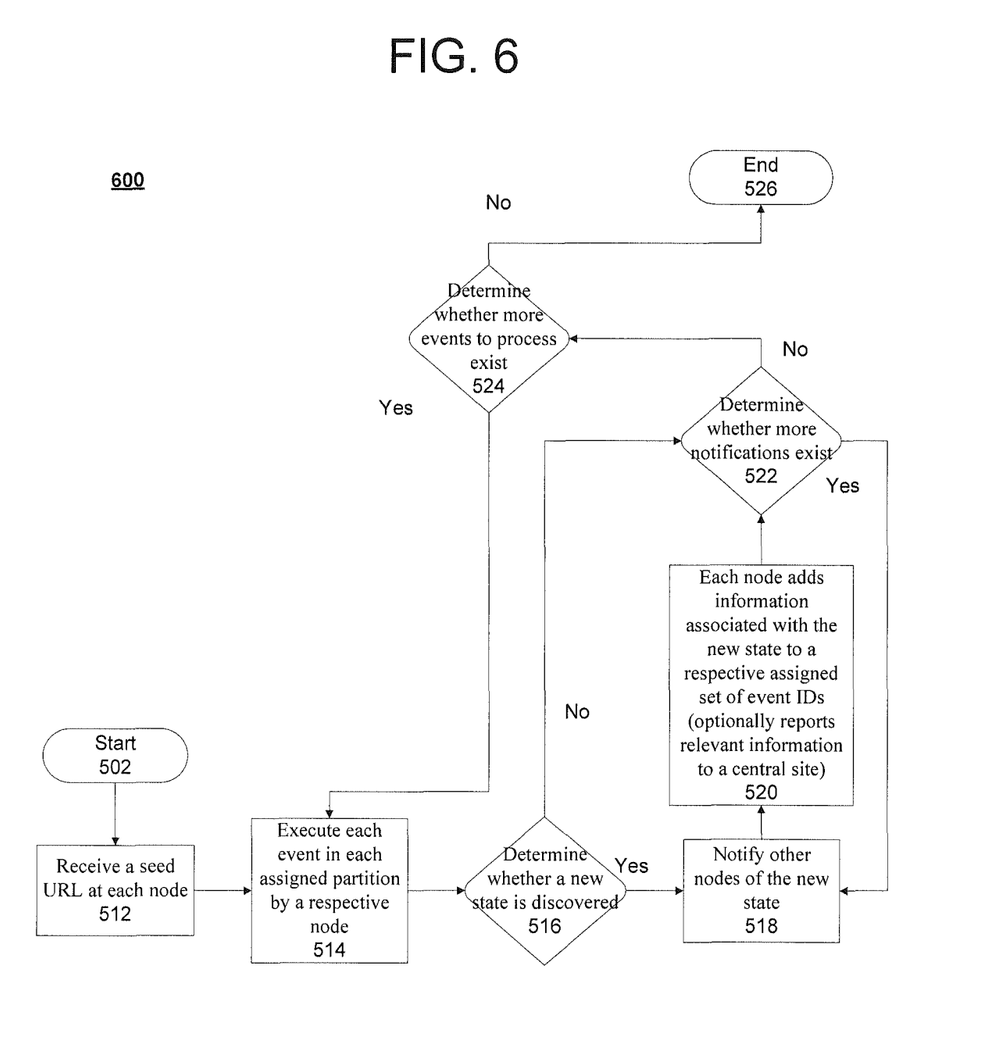
FIG. 6 is a flow chart of a process used across all nodes in the partitioning system of FIG. 3 operable for various embodiments of the disclosure.

With reference to FIG. 6 a flow chart of a process used across all nodes in a partitioning system operable for various embodiments of the disclosure is presented. Process 600 is an example of a portion of the process of using a system for partitioning a crawling space of a rich Internet application for distributed crawling as in partitioning system 300 of FIG. 3.

Process 600 represents the portion of process 500, which is applicable to all nodes that participate in the partitioning process.

Figure 7:
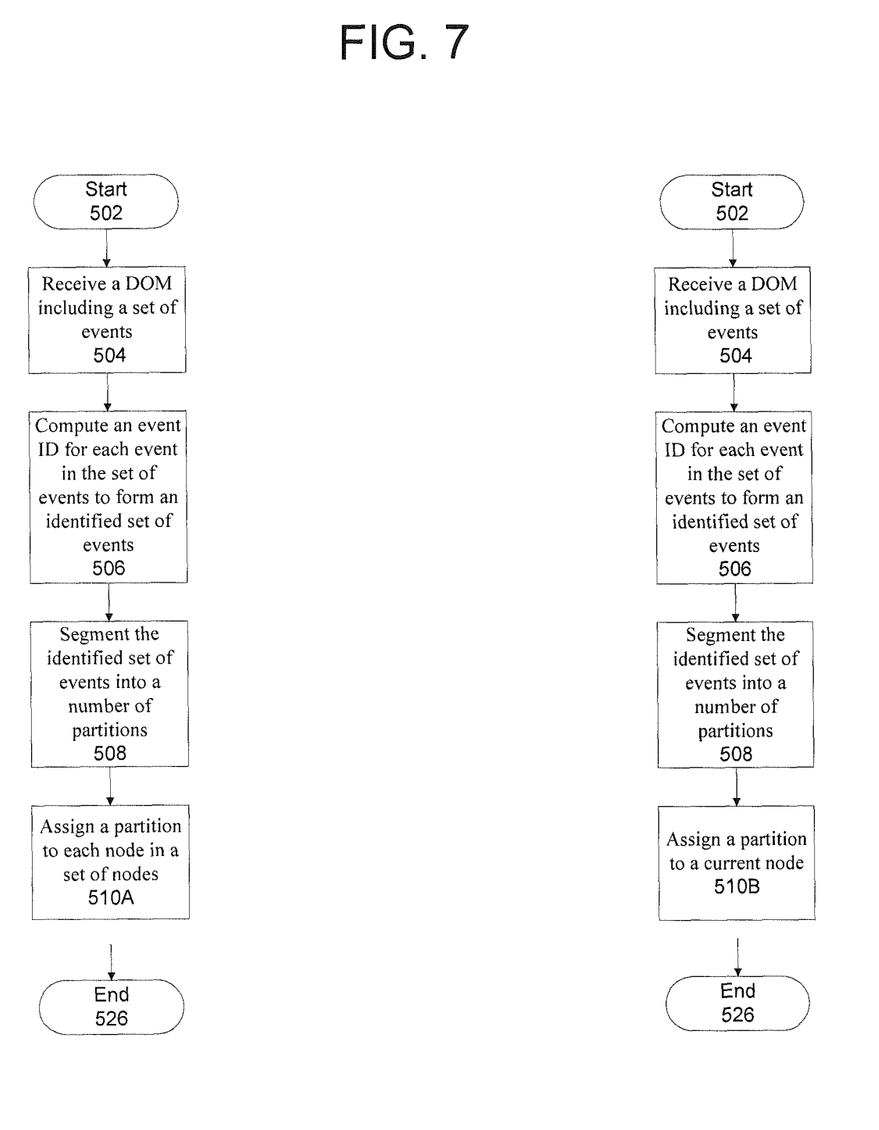
FIG. 7 presents flow charts of a process used in alternate modes of the partitioning system of FIG. 3 operable for various embodiments of the disclosure.

With reference to FIG. 7 flow charts of a process used in alternate modes of a partitioning system operable for various embodiments of the disclosure is presented. Each alternative is an example of a portion of process 500 of FIG. 5 using a system for partitioning a crawling space of a rich Internet application for distributed crawling as in partitioning system 300 of FIG. 3.

A first example represents a portion of process 500 of FIG. 5, which is applicable to a centralized implementation of a partitioning process. When the partitioning is centralized all nodes and other processing modules are required to communicate with the centralized unit, thereby increasing message traffic as well as control. Using a centralized implementation of the partitioning implements step 510 of process 500 of FIG. 5 as variant 510A.

A second example represents a portion of process 500 of FIG. 5, which is applicable to a decentralized implementation of a partitioning process. When the partitioning is decentralized and hosted on all nodes communication among nodes and other processing modules is reduced from that which is required using the centralized unit, thereby reducing message traffic as well as control. Using a decentralized implementation of the partitioning implements step 510 of process 500 of FIG. 5 as variant 510B, which assigns a partition to a current node.

Thus is presented in an illustrative embodiment a computer-implemented process for partitioning a crawling space. The computer-implemented process computes an event identifier for each event in the set of events to form an identified set of events, segments the identified set of events into a number of partitions, assigns a partition to each node in a set of nodes and executes each event in each assigned partition by a respective node. Responsive to a determination that a new state is discovered, other nodes are notified of the new state, in which information associated with the new state is added to a respective assigned set of event IDs at each node. Responsive to a determination that no more notifications exist, the computer-implemented process determines whether more events to process exist and responsive to a determination that no more events to process exist, the computer-implemented process terminates.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which include one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or to limit the invention in the specific forms disclosed. Many modifications and variations will be apparent to those of ordinary skill in the art without departing from the scope and spirit of the invention. The embodiments were chosen and described in order to best explain the principles of the invention and the practical applications, while enabling others of ordinary skill in the art to understand and practice the invention with various modifications as are suited to the particular use contemplated.

Embodiments of the invention can take the form of an entirely hardware embodiment, an entirely software embodiment or an embodiment containing both hardware and software elements. For example, an embodiment may be implemented in software, which includes but is not limited to firmware, resident software, microcode, and other software media that may be recognized by one skilled in the art.

It is important to note that while the embodiments of the present invention have been described in the context of a fully functioning data processing system, those of ordinary skill in the art will appreciate that the processes of certain embodiments are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process for partitioning a crawling space, comprising:

computing an event identifier for each event in a set of events to form an identified set of events;

segmenting the identified set of events into a number of partitions, the segmenting comprising selecting a method of partitioning from a plurality of methods of partitioning, the selecting based on at least one of a number of events per node or a processing capability of a node;

assigning at least one partition to each node in a set of decentralized nodes;

executing each event in each assigned partition by a respective node, the executing in parallel by a respective decentralized node;

determining whether a new state is discovered;

responsive to a determination that the new state is discovered, notifying other nodes of the new state;

adding information associated with the new state to a respective assigned set of event identifiers at each node;

determining whether more notifications exist;

responsive to a determination that no more notifications exist, determining whether more events to process exist; and responsive to a determination that no more events to process exist, terminating.

2. The computer-implemented process of claim 1 wherein the computing an event identifier for each event in the set of events to form an identified set of events further comprises receiving a document object model including the set of events, wherein each event in the set of events is a JavaScript event.

3. The computer-implemented process of claim 1 wherein the computing an event identifier for each event in the set of events to form an identified set of events further comprises selecting a computation method from a group comprising:

a first computation using an index of events in a document object model, wherein the index is computed by traversing the document object model starting from a root outward towards leaves using a breadth first search, wherein a first JavaScript event encountered is assigned an index value of 0, and each next JavaScript event encountered is assigned an index value incremented by 1 from a previous JavaScript event encountered; and a second computation in which an XPath of an identified event in the set of events forms an event identifier.

4. The computer-implemented process of claim 3 wherein the segmenting the identified set of events into a number of partitions further comprises: dividing identified event identifiers among nodes, wherein a division is determined according to the computation method used to compute the event identifiers, wherein when the first computation is used, division of the event identifiers uses ranges and a modulo function, wherein for n nodes each node receives 1/n set of events and for each event the identifier modulo n provides an index of a node responsible for executing that particular event identifier, and wherein when the second computation is used, the division is determined using a tree structure of the document object model, assigning each different branch to a different node.

5. The computer-implemented process of claim 1 wherein the computing an event identifier for each event in the set of events to form an identified set of events that further defines a crawling space of a rich Internet application for distributed crawling.

6. The computer-implemented process of claim 1 wherein the adding information associated with the new state to a respective assigned set of event identifiers at each node further comprises adding information including sequences of JavaScript actions required to reach the new state.

7. The computer-implemented process of claim 1 wherein the notifying other nodes of the new state further comprises communicating the information by one of nodes broadcasting, using a token ring, posting to a common site where other nodes periodically view posts to identify additional work items of the newly discovered states that have not been notified previously.

8. The computer-implemented process of claim 1, wherein the plurality of methods of partitioning comprise: defining a partition as a specific number of events per node, defining a partition as a percentage of events per node, defining a partition as a number of partitioned events determined by dividing by the number of nodes, and defining a partition as a number of partitioned events proportional to a processing capability of each node.

9. A computer program product for partitioning a crawling space, comprising a non-transitory storage medium embodied with machine-readable program instructions, which when executed by a computer causes the computer to implement a process, the process comprising:
- computing an event identifier for each event in the set of events to form an identified set of events;
- segmenting the identified set of events into a number of partitions, the segmenting comprising selecting a method of partitioning from a plurality of methods of partitioning the selecting based on at least one of a number of events per node or a processing capability of a node;
- assigning at least one partition to each node in a set of decentralized nodes;
- each event in each assigned partition by a respective node, the executing in parallel by a respective decentralized node;
- determining whether a new state is discovered;
- responsive to a determination that the new state is discovered, notifying other nodes of the new state;
- adding information associated with the new state to a respective assigned set of event identifiers at each node;
- determining whether more notifications exist;
- responsive to a determination that no more notifications exist, determining whether more events to process exist; and
- responsive to a determination that no more events to process exist, terminating.

10. The computer program product of claim 9 wherein the computing an event identifier for each event in the set of events to form an identified set of events further comprises receiving a document object model including the set of events, wherein each event in the set of events is a JavaScript event.

11. The computer program product of claim 9 wherein the computing an event identifier for each event in the set of events to form an identified set of events further comprises selecting a computation method from a group comprising:
- a first computation using an index of events in a document object model, wherein the index is computed by traversing the document object model starting from a root outward towards leaves using a breadth first search, wherein a first JavaScript event encountered is assigned an index value of 0, and each next JavaScript event encountered is assigned an index value incremented by 1 from a previous JavaScript event encountered; and
- a second computation in which an XPath of an identified event in the set of events forms an event identifier.

12. The computer program product of claim 11 wherein the segmenting the identified set of events into a number of partitions further comprises:
dividing identified event identifiers among nodes, wherein a division is determined according to the computation method used to compute the event identifiers, wherein when the first computation is used, computer executable program code for division of the event identifiers uses ranges and a modulo function, wherein for n nodes each node receives 1/n set of events and for each event the identifier modulo n provides an index of a node responsible for executing that particular event identifier, and wherein when the second computation is used, computer executable program code for the division uses a tree structure of the document object model, assigning each different branch to a different node.

13. The computer program product of claim 9 wherein the computing an event identifier for each event in the set of events to form an identified set of events that further defines a crawling space of a rich Internet application for distributed crawling.

14. The computer program product of claim 9 wherein the adding information associated with the new state to a respective assigned set of event identifiers at each node further comprises adding information including sequences of JavaScript actions required to reach the new state.

15. The computer program product of claim 9 wherein the notifying other nodes of the new state further comprises communicating the information by one of nodes broadcasting, using a token ring, and posting to a common site where other nodes periodically view posts to identify additional work items of the newly discovered states that have not been notified previously.

16. An apparatus for partitioning a crawling space, the apparatus comprising:
- a communications fabric;
- a memory connected to the communications fabric, wherein the memory contains computer executable program code;
- a communications unit connected to the communications fabric;
- an input/output unit connected to the communications fabric;
- a display connected to the communications fabric; and
- a processor connected to the communications fabric configured to:
  - compute an event identifier for each event in the set of events to form an identified set of events,
  - segment the identified set of events into a number of partitions, the segmenting comprising selecting a method of partitioning from a plurality of methods of partitioning, the selecting based on at least one of a number of events per node or a processing capability of a node,
  - assign at least one partition to each node in a decentralized set of nodes,
  - execute each event in each assigned partition by a respective node, the executing in parallel by a respective decentralized node,
  - determine whether a new state is discovered,
  - responsive to a determination that the new state is discovered, notify other nodes of the new state;
  - add information associated with the new state to a respective assigned set of event identifiers at each node,
  - determine whether more notifications exist, responsive to a determination that no more notifications exist, determine whether more events to process exist; and responsive to a determination that no more events to process exist, terminate.

17. The apparatus of claim 16 wherein the processor is further configured to compute an event identifier for each event in the set of events to form an identified set of events and to receive a document object model including the set of events, wherein each event in the set of events is a JavaScript event.

18. The apparatus of claim 16 wherein the processor is further configured to compute an event identifier for each event in the set of events to form an identified set of events further directs the apparatus to:

select a computation method from a group comprising:

a first computation using an index of events in a document object model, wherein the index is computed by traversing the document object model starting from a root outward towards leaves using a breadth first search, wherein a first JavaScript event encountered is assigned an index value of 0, and each next JavaScript event encountered is assigned an index value incremented by 1 from a previous JavaScript event encountered; and a second computation in which an XPath of an identified event in the set of events forms an event identifier.

19. The apparatus of claim 18 wherein the processor is further configured to segment the identified set of events into a number of partitions:

dividing identified event identifiers among nodes, wherein a division is determined according to the computation method used to compute the event identifiers, wherein when the first computation is used, division of the event identifiers uses ranges and a modulo function, wherein for n nodes each node receives 1/n set of events and for each event the identifier modulo n provides an index of a node responsible for executing that particular event identifier, and wherein when the second computation is used, the division is determined using a tree structure of the document object model, assigning each different branch to a different node.

20. The apparatus of claim 16 wherein the processor is further configured to compute an event identifier for each event in the set of events to form an identified set of events that further defines a crawling space of a rich Internet application for distributed crawling.

* * * * *